US008496259B2

(12) United States Patent
Ramsey

(10) Patent No.: US 8,496,259 B2
(45) Date of Patent: Jul. 30, 2013

(54) SLIDER BOX FOR A HEAVY-DUTY VEHICLE

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/490,522

(22) Filed: Jun. 7, 2012

(65) Prior Publication Data

US 2012/0313342 A1 Dec. 13, 2012

Related U.S. Application Data

(60) Provisional application No. 61/494,086, filed on Jun. 7, 2011.

(51) Int. Cl.
*B62D 33/08* (2006.01)
*B62D 21/00* (2006.01)
(52) U.S. Cl.
USPC ..................... 280/149.2; 280/788; 180/209
(58) Field of Classification Search
USPC ....... 280/800, 149.2, 781, 795, 788; 180/209; 403/231, 403
See application file for complete search history.

(56) References Cited

U.S. PATENT DOCUMENTS

| 3,372,946 | A | | 3/1968 | Hutchens |
| 3,448,995 | A | * | 6/1969 | Doreen et al. ......... 280/124.106 |
| 3,778,079 | A | | 12/1973 | Vornberger et al. |
| 4,641,846 | A | | 2/1987 | Ehrhart |
| 4,838,566 | A | | 6/1989 | Baxter et al. |
| 5,088,763 | A | * | 2/1992 | Galazin et al. ................ 280/656 |
| 5,137,296 | A | | 8/1992 | Forman |
| 5,346,233 | A | | 9/1994 | Moser |
| 5,378,006 | A | * | 1/1995 | Stuart et al. ................ 280/149.2 |
| 5,564,725 | A | | 10/1996 | Brazeal |
| 5,720,489 | A | * | 2/1998 | Pierce et al. ................ 280/149.2 |
| 6,213,507 | B1 | | 4/2001 | Ramsey et al. |
| 6,733,040 | B1 | | 5/2004 | Simboli |
| 7,198,298 | B2 | * | 4/2007 | Ramsey ........................ 280/793 |
| 7,207,593 | B2 | * | 4/2007 | Saxon et al. .................. 280/678 |
| 7,549,660 | B2 | * | 6/2009 | Ramsey et al. ............ 280/149.2 |
| 7,600,785 | B2 | * | 10/2009 | Ramsey ........................ 280/781 |
| 2001/0035622 | A1 | | 11/2001 | Fabris et al. |
| 2005/0218646 | A1 | | 10/2005 | Ramsey |
| 2006/0170205 | A1 | | 8/2006 | Ramsey et al. |
| 2007/0045981 | A1 | * | 3/2007 | Galazin et al. ............. 280/149.2 |
| 2012/0248728 | A1 | * | 10/2012 | Horton ....................... 280/149.2 |
| 2012/0248729 | A1 | * | 10/2012 | Horton ....................... 280/149.2 |

\* cited by examiner

*Primary Examiner* — Drew Brown
(74) *Attorney, Agent, or Firm* — Dureska, Kennedy & Moore, LLC; David P. Dureska; Brent L. Moore

(57) ABSTRACT

A frame for a heavy-duty vehicle trailer includes a pair of elongated, spaced-apart parallel main members, each one having a pair of spaced apart parallel vertical walls. At least one cross member extends between and attaches to the main members, and includes a pair of spaced apart parallel transversely-extending vertical walls. Each one of a first pair of hangers includes a pair of spaced-apart parallel vertical walls that generally align and attach to the main member vertical walls. Each hanger includes a hanger support having a pair of spaced apart parallel vertical webs integrally formed with a diagonally extending side member. The hanger support attaches to the inboard hanger wall and also to the cross member. The frame reduces weight and provides improved reaction of longitudinal and side loads, yet still efficiently reacts vertical and racking loads imparted on the frame during operation of the vehicle.

13 Claims, 9 Drawing Sheets

SLIDER BOX FOR A HEAVY-DUTY VEHICLE

CROSS-REFERENCE TO RELATED APPLICATION

This application claims the benefit of U.S. Provisional Patent Application Ser. No. 61/494,086, filed Jun. 7, 2011.

BACKGROUND OF THE INVENTION

1. Field of the Invention

The invention relates generally to the art of tractor-trailer frames and subframes for heavy-duty wheeled vehicles, and in particular to subframes for trailers such as van trailers. More specifically, the invention is directed to an improved slider box for a heavy-duty vehicle which includes a pair of spaced apart longitudinally extending main members. Each main member includes a pair of spaced apart generally parallel vertical walls that generally align with the spaced apart generally parallel inboard and outboard vertical walls of the hangers. The slider box utilizes hanger supports with front and rear vertical webs that align with spaced apart front and rear vertical walls of a cross member. In combination, these structural improvements allow for use of main members, cross members, hangers, supports and support members having generally thinner walls, with the slider box having improved buckle resistance, and also allow for the removal of certain cross brace members attached to the main members of the slider box, thereby reducing weight and providing improved reaction of longitudinal and side forces, yet still efficiently reacting vertical and racking forces imparted on the slider box during operation of the vehicle.

2. Background Art

Moveable subframes, typically referred to as slider boxes, slider subframes, slider undercarriages, or slider secondary frames, have been utilized on tractor-trailers or semi-trailers for many years. One or more axle/suspension systems usually are suspended from a single slider box. For purposes of clarity, hereafter, the present invention will be referred to as a slider box. It is understood that a slider box outfitted with usually two axle/suspension systems typically is referred to as a slider or slider tandem, and again, for purposes of clarity will hereinafter be referred to as a slider box. The slider box in turn is mounted on the underside of the trailer frame, and is moveable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider box gains an advantage with respect to laws governing maximum axle loads. More particularly, proper placement of the slider box varies individual axle loads or redistributes the trailer load so that it is within legal limits. Once properly positioned, the slider box is locked in place on the underside of the trailer by a retractable pin mechanism.

Conventional or prior art slider box designs were developed before the advent of air suspension systems for trailers. At that time, leaf spring suspension systems were the suspension of choice for trailer frames and slider boxes. However, the leaf spring suspension system was unable to provide adequate load distribution for varying load situations.

Moreover, the subsequent development of air suspension systems provided load equalization among multiple axles for tractor-trailers, with or without the utilization of slider boxes, as well as improved ride quality for individual axles. Of course, the combination of a moveable slider box and an air suspension system provided maximum versatility with respect to variable load distribution and load equalization for a trailer. Unfortunately, prior art slider boxes equipped with air suspensions added unwanted weight to the trailer, primarily because those slider boxes were originally built to support spring suspensions and adapting them to incorporate air suspensions required additional bracing and support.

Vehicles containing more than one non-steerable axle, including tractor-trailers, are subject to lateral or side loads. Side loads can act through the slider box in opposite directions and the effect of such bending loads on the slider box can be significant. Moreover, a slider box is subjected to strong vertical and longitudinal loads. Thus, the loads to which the slider box is subjected must be controlled by the slider box design. Prior art slider box designs control side and longitudinal loads by utilizing rigid, and therefore heavy, main members and cross members typically made of steel. The cross members often are spaced-apart and parallel to one another, and perpendicular to the longitudinally extending elongated main members. A K-shaped cross member, as shown, described and claimed in U.S. Pat. No. 5,720,489 assigned to the same assignee, Hendrickson USA, L.L.C., as the instant invention, also have been utilized. Although the device described in the '489 patent satisfactorily performed its function, room for improvement still exists particularly with respect to maintaining or increasing the overall strength of the slider box while decreasing its weight.

Thus, within the trucking industry, reducing the weight of carrier equipment without sacrificing durability directly improves productivity by increasing the available payload that can be transported by the vehicle. Slider boxes made of steel have contributed to the excessive weight problems that have plagued slider boxes in the past. Although certain prior art slider boxes formed of steel have exhibited weight and durability improvement over other prior art steel slider boxes, such as the improvements resulting from the slider box of the '489 patent, the trucking industry continually is striving for additional optimization in slider box design. Moreover, attempts to utilize materials that are lighter than steel to construct slider boxes, such as aluminum, have been largely unsuccessful and inefficient.

Because the slider boxes having air suspensions were not connected to hanger brackets in the rear of the axles like the leaf spring suspensions that had come before them, more forces and/or loads were concentrated at the hanger brackets in front of the axles. C-shaped main members allowed for full height cross members to be used which help support the greater loads at the hanger brackets as well as the greatly concentrated loads above the air springs which were cantilevered inboard of the main members. More specifically, the increased load inputs at the hanger brackets included side loads due to drag turns that had a greater tendency to twist or rack the slider box than the prior art leaf spring suspensions. The C-shaped main member design of the slider box was conducive to incorporating angled cross members such as those shown and described in the '489 patent that effectively reacted the racking loads.

However, at least one issue in the C-shaped main member design for slider boxes became apparent when trailers turned corners too sharply causing the tires of the vehicle to impact obstacles such as lamp posts, concrete abutments, and the like. These impacts result in large longitudinal and side loads being delivered to the end of the axle of the axle/suspension system near the obstacle. These loads in turn result in considerable longitudinal and side loads being reacted at the hanger bracket. The longitudinal pulling and the sideways twisting actions on the hanger bracket could potentially result in buckling or bending of the main member of the slider box.

The present invention solves the above problems associated with prior art slider box designs by utilizing main members having spaced apart generally parallel vertical walls that generally align with the spaced apart generally parallel vertical inboard and outboard walls of the hangers. The slider box utilizes lateral hanger supports with front and rear vertical webs that generally align with spaced apart parallel vertical walls of the frame cross member. In combination, these structural improvements allow for use of main members, cross members, hangers, supports and support members having generally thinner walls with improved slider box buckle resistance. The improvements of the present invention also enable removal of additional angled cross brace members adjacent the rear axle/suspension system of the slider box, thereby reducing the weight of the slider box. The hanger support distributes side loads directly into the base member of the cross brace or cross member structure located above the hanger, allowing the hanger to react larger loads. An air spring support allows for full air spring head support substantially directly above the inboard cantilevered air spring. This air spring support provides strong support to the air spring during operation of the vehicle. Racking load support for the slider box structure is provided by the angled cross members adjacent the front axle/suspension system, thus allowing for a straight horizontal rear cross brace adjacent the rear axle/suspension system, which is able to effectively react the applicable racking loads at the rear of the slider box yet reduces weight by eliminating the need for angled cross brace members adjacent the rear axle/suspension system. A channel disposed in the main members between the front and rear pairs of hangers provides additional localized support to the slider box, thereby helping to prevent possible bending or buckling of the main members during operation of the heavy-duty vehicle and enabling further wall thickness reduction to the main members, cross members, hangers, supports and support members of the slider box. These advantages reduce the overall weight of the slider box without loss of structural integrity, but rather with an improvement thereto.

SUMMARY OF THE INVENTION

Objectives of the present invention include providing a slider box for a heavy-duty vehicle that allows use of main members, cross members, hangers and air spring and hanger support members having generally thinner walls, thereby reducing the weight of the slider box.

A further objective of the present invention is to provide a slider box for a heavy-duty vehicle that enables removal of additional angled cross brace members of the slider box, thereby reducing the weight of the slider box while still efficiently reacting vertical, lateral and racking loads of the axle/suspension systems during operation of the vehicle.

Yet another objective of the present invention is to provide a slider box for a heavy-duty vehicle that reduces the overall weight of the slider box without loss of structural integrity, but rather with an improvement thereto.

These objectives and advantages are obtained by the frame for a heavy-duty vehicle trailer of the present invention that includes: a pair of spaced-apart, parallel, elongated and longitudinally extending main members, each one of the pair of main members including a pair of spaced apart parallel vertical longitudinally extending walls; at least one cross member extending between and being attached to the main members, the cross member including a pair of spaced apart parallel transversely-extending front and rear vertical walls; and a first pair of hangers, each one of the hangers including a pair of spaced-apart parallel vertical walls, the hanger vertical walls each generally being aligned with and attached to a respective one of the main member vertical walls, each one of the hangers including a hanger support, the hanger support including a pair of spaced apart front and rear vertical webs formed with a diagonally extending side member, the hanger support attached to an inboard hanger vertical wall and to the cross member, so that the hanger support parallel vertical webs each generally align with a respective one of the cross member vertical walls.

BRIEF DESCRIPTION OF THE SEVERAL VIEWS OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

DESCRIPTION OF THE PREFERRED EMBODIMENT

Figure 1:
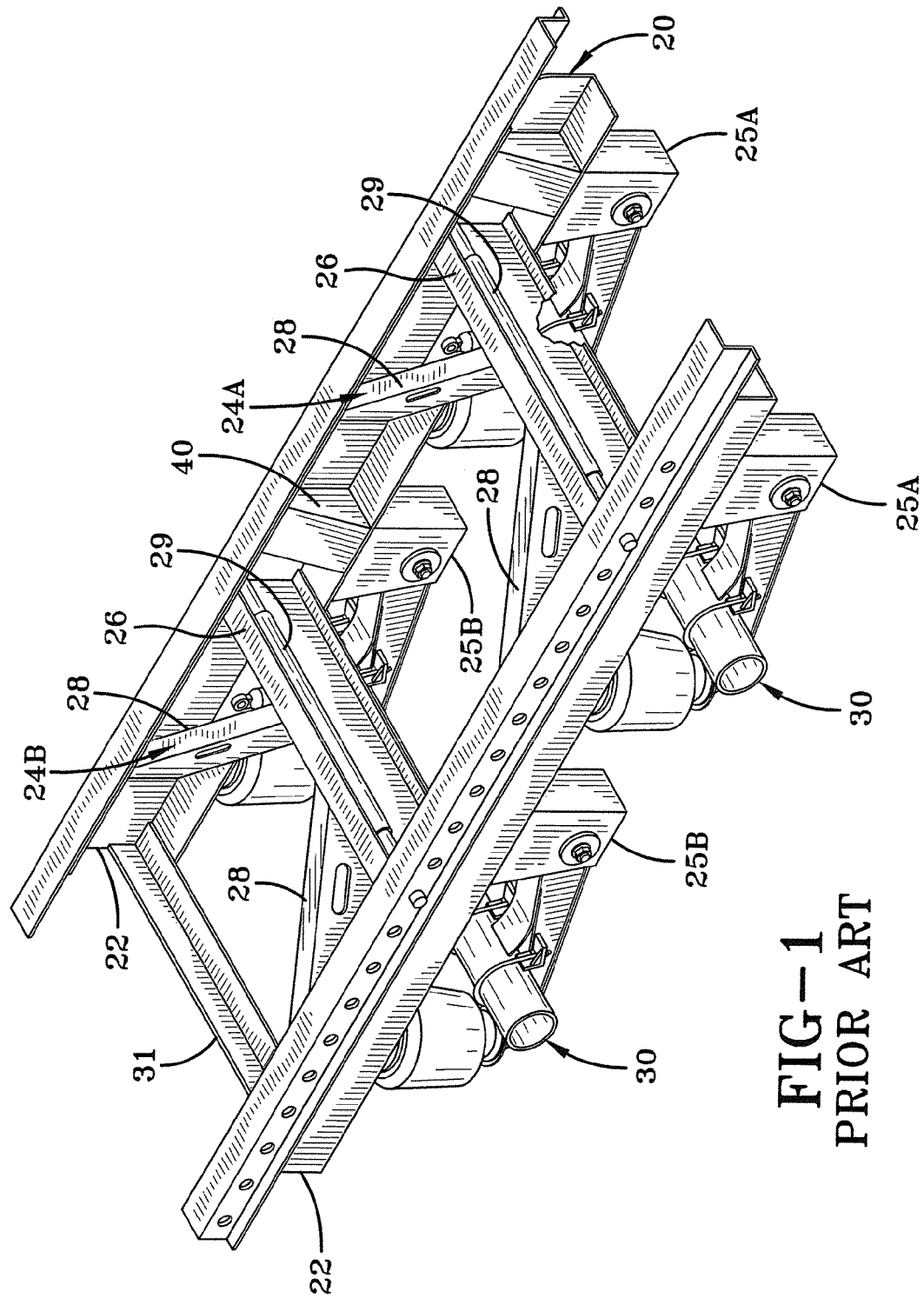
FIG. 1 is a top front perspective view of a conventional prior art slider box for a semi-trailer, having a pair of generally K-shaped cross members adjacent front and rear axle/suspension systems, showing the hangers for suspending the axle/suspension systems, and further showing the retractable pin mechanism used to selectively locate the slider box along the underside of a trailer.

So that the structure and resulting advantages of the present invention can be better understood, a prior art slider box now will be described and is shown in FIG. 1 and is indicated by numeral 20. Slider box 20 includes a pair of elongated, longitudinally extending, spaced-apart parallel main members 22. Main members 22 are connected to each other by a pair of K-shaped cross members 24A and 24B. K-shaped cross members 24A,B extend between and typically each nest in and are welded to main members 22 to form interconnected rigid slider box structure 20. Front and rear pairs of hangers 25A and 25B, respectively, of slider box 20 suspend tandem axle/suspension systems 30 from main members 22.

Figure 2:
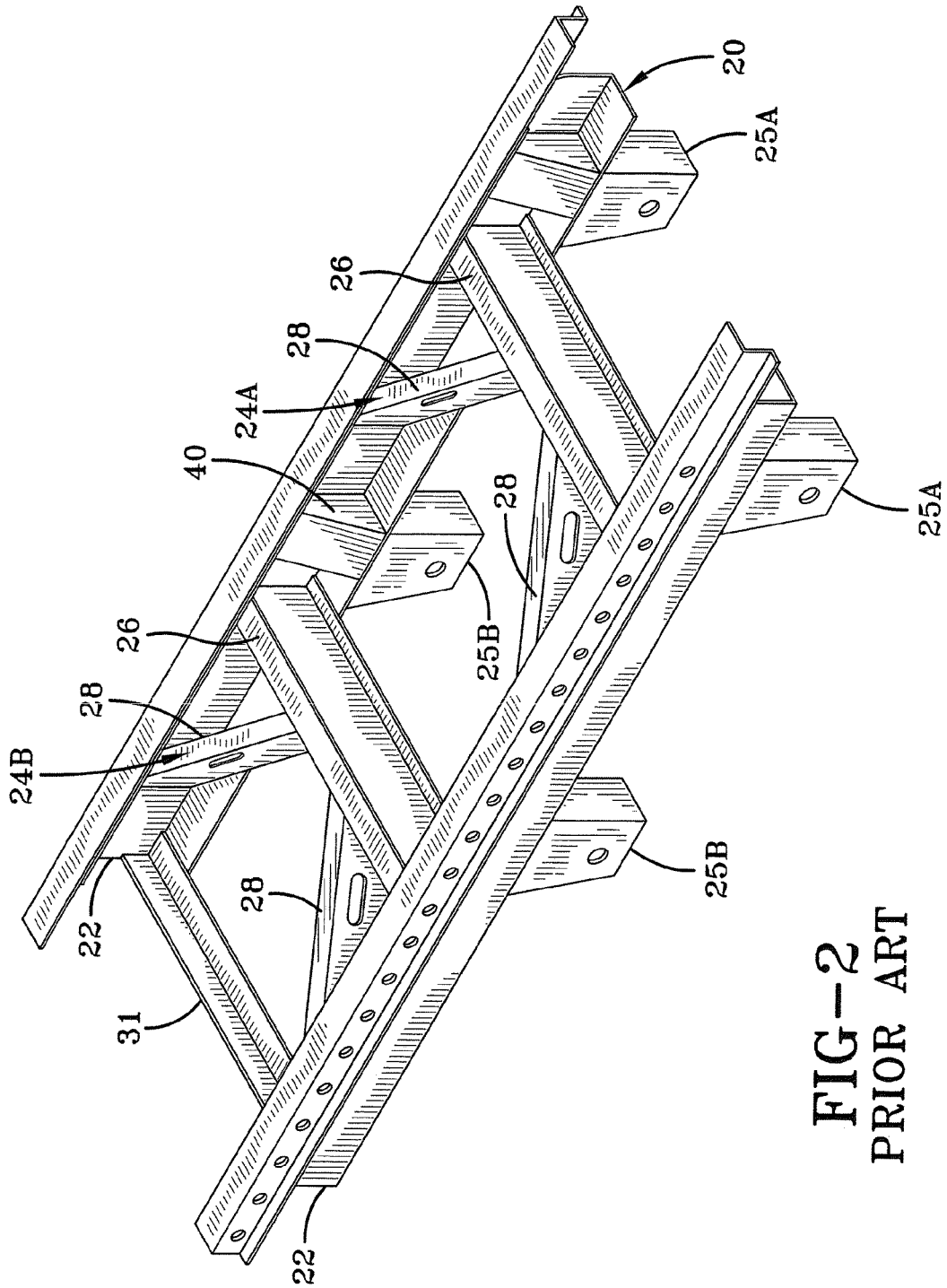
FIG. 2 is a top front perspective view of the slider box shown in FIG. 1, but with the front and rear axle/suspension systems and the retractable pin mechanism removed.

More specifically, each main member 22 is a generally C-shaped cross-sectional beam typically made of steel and having a material thickness of approximately 0.232 in. The open portion of each main member 22 is opposed to the open portion of the other main member and faces inboard in relation to slider box 20. Each K-shaped cross member 24A,B also is formed of steel and includes a base member 26 which extends between and is perpendicular to main members 22, and two inclined or angled cross brace members 28, each of which extend in a generally diagonal manner between a generally central portion of the base member and a respective one of the main members 22, as shown in FIGS. 1 and 2. Each end of base member 26, and the outboard end of each cross brace 28, nests in the open portion of a respective one of main members 22, and are secured therein by any suitable means such as welding, again creating generally concentrated loadings at the point of attachment as with other similar prior art slider boxes. A pair of steel reinforcement boxes 40 are mounted on main members 22 adjacent to and above rear hangers 25 to provide additional strength to slider box 20 for supporting hangers 25A,B, and axle/suspension systems 30 pivotally attached thereto. A reinforcement bar 31 is mounted on and extends between the rear ends of main members 22 to provide additional strength to the overall structure of slider box 20. A retractable pin mechanism 29 used for locking slider box 20 in place on a primary frame (not shown) of a vehicle also is shown, but does not form part of the slider box. As noted above, slider box 20 is formed primarily of steel, thereby increasing the overall weight of the slider box, which is undesirable, and may potentially concentrate longitudinal or side loadings during hard corners wherein the tires of the vehicle are subjected to impact with obstacles such as lamp posts, concrete abutments and the like. These large longitudinal loads delivered to the near end of the axle result in considerable longitudinal and side forces that are reacted at the hanger bracket. The longitudinal pulling and sideways twisting actions on the hanger bracket may potentially result in buckling or bending of the main member. As a result, a need has existed in the art to develop a slider box that overcomes the disadvantages of the prior art and provides a more lightweight, yet sturdy, stable, and economical slider box that is capable of effectively distributing the loads imparted on the main members from the axle/suspension systems to the other slider box components during operation of the vehicle. The slider box of the present invention overcomes the problems associated with prior art slider boxes, and will now be described in detail below.

Figure 3:
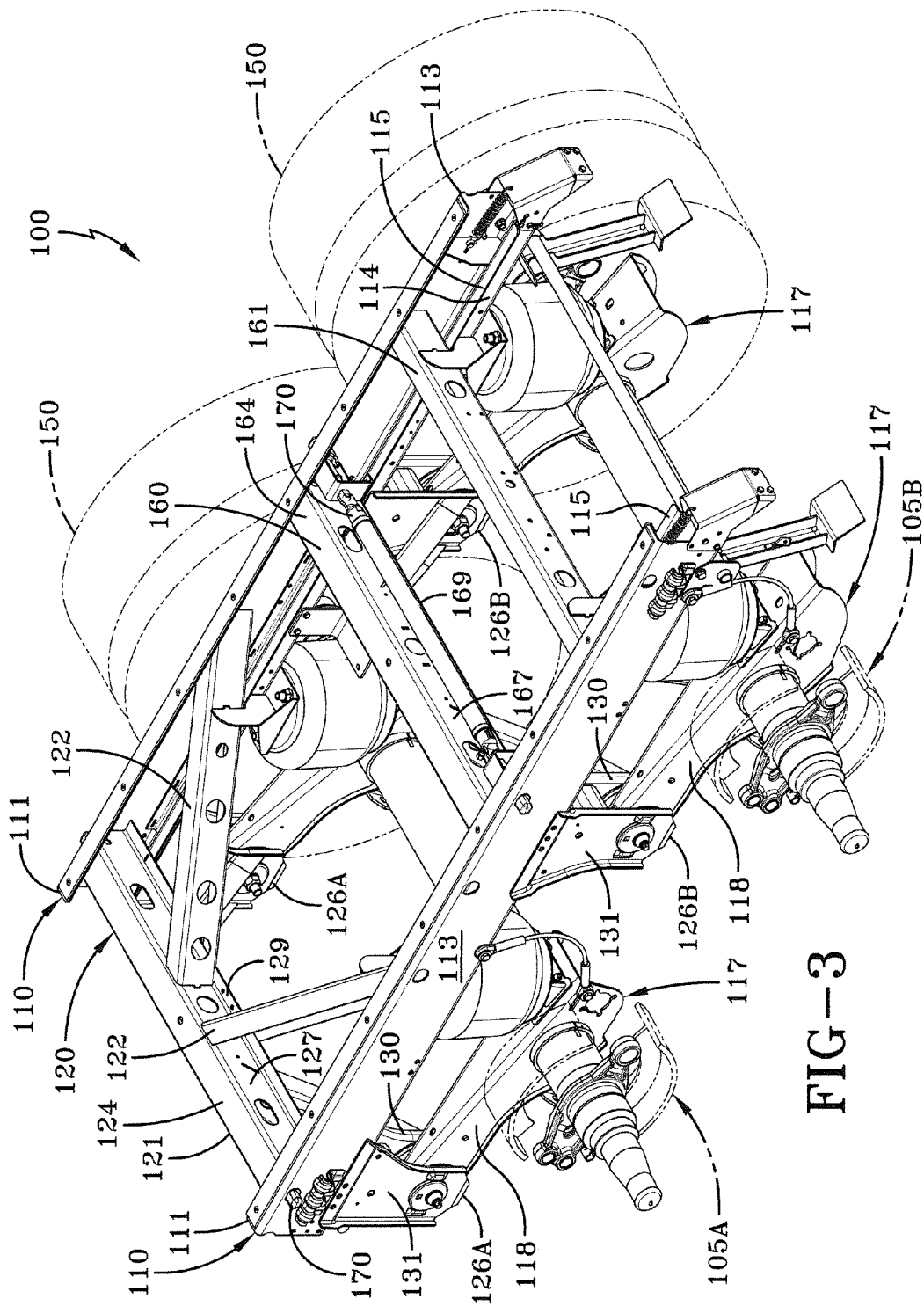
FIG. 3 is a top rear perspective view of a preferred embodiment slider box of the present invention utilized in conjunction with a pair of axle/suspension systems, showing the G-shaped main members, the front K-shaped cross member disposed adjacent and above the front axle/suspension system, the rear cross brace disposed adjacent and above the rear axle/suspension system, and further showing the hanger supports and the air spring supports.
Figure 4:
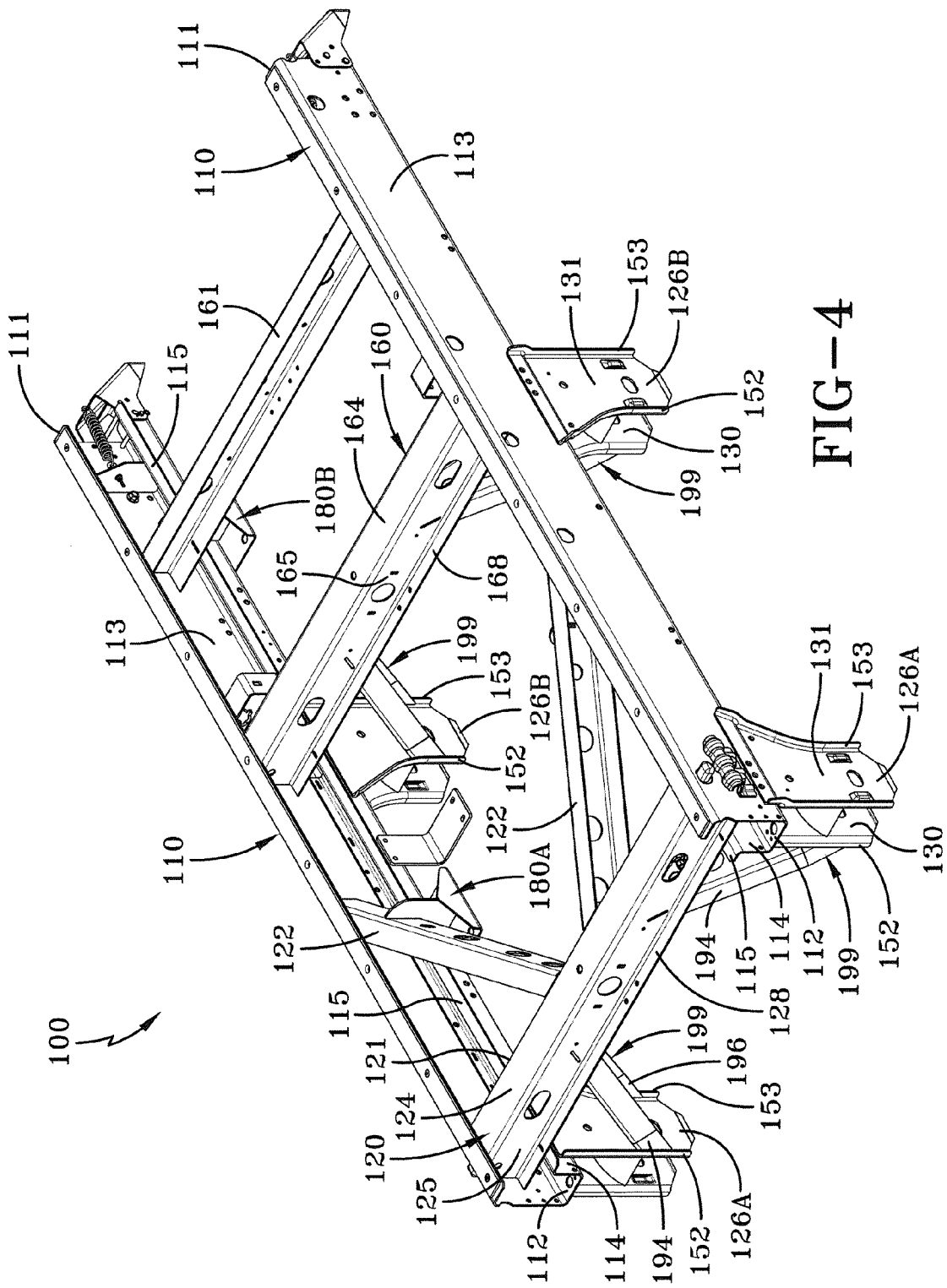
FIG. 4 is a top front perspective view of the slider box of the present invention shown in FIG. 3, but with the front and rear axle/suspension systems removed.

A preferred embodiment slider box of the present invention useful in tractor-trailers or other similar heavy-duty vehicles is indicated generally at 100 and is shown in FIGS. 3-4. Although slider box 100 of the present invention is similar in certain respects to prior art K-shaped slider box 20 described hereinabove and shown in FIGS. 1 and 2, slider box 100 exhibits many structural differences, thereby contributing to the improved performance of the slider box of the present invention over known prior art slider boxes. The structural and resulting performance differences between slider box 100 of the present invention and prior art slider box 20 now will be described. It should be understood that while the preferred embodiment of the present invention is directed to a slider box or moveable subframe, the concepts of the present invention also can be effectively applied to non-moveable subframes and primary frames of heavy-duty vehicles.

Slider box 100 includes a pair of main members 110, a front generally K-shaped cross member structure 120, a rear cross member 160, a rear cross brace 161, and front and rear pairs of hangers 126A and 126B, respectively. Cross member 120 includes a base member 121 and a pair of angled cross brace members 122. Base member 121 has a generally hat-shaped cross-section and is integrally formed with a front flange 128, a front vertical wall 125, a top wall 124, a rear vertical wall 127, and a rear flange 129. Each one of cross brace members 122 is connected at its inboard end to the rear vertical surface of base member rear vertical wall 127 and at its outboard end to a respective one of the inboard surfaces of main members 110.

In accordance with an important feature of slider box 100 of the present invention, main members 110 each have generally spaced apart parallel vertical walls 114 and 113 and a G-shaped transverse cross-section. More specifically, each G-shaped main member 110 is integrally formed with a horizontal top plate 111 and a horizontal bottom plate 112 connected at their outboard ends by a vertically-extending outboard wall 113. The inboard end of bottom plate 112 is formed with a vertically-extending inboard wall 114 formed with a horizontally inboardly-extending lip 115. Main members 110 are formed from steel or other sturdy material having a thickness of preferably from about 0.231 in. to about 0.164 in., and most preferably about 0.164 in.

Figure 3A:
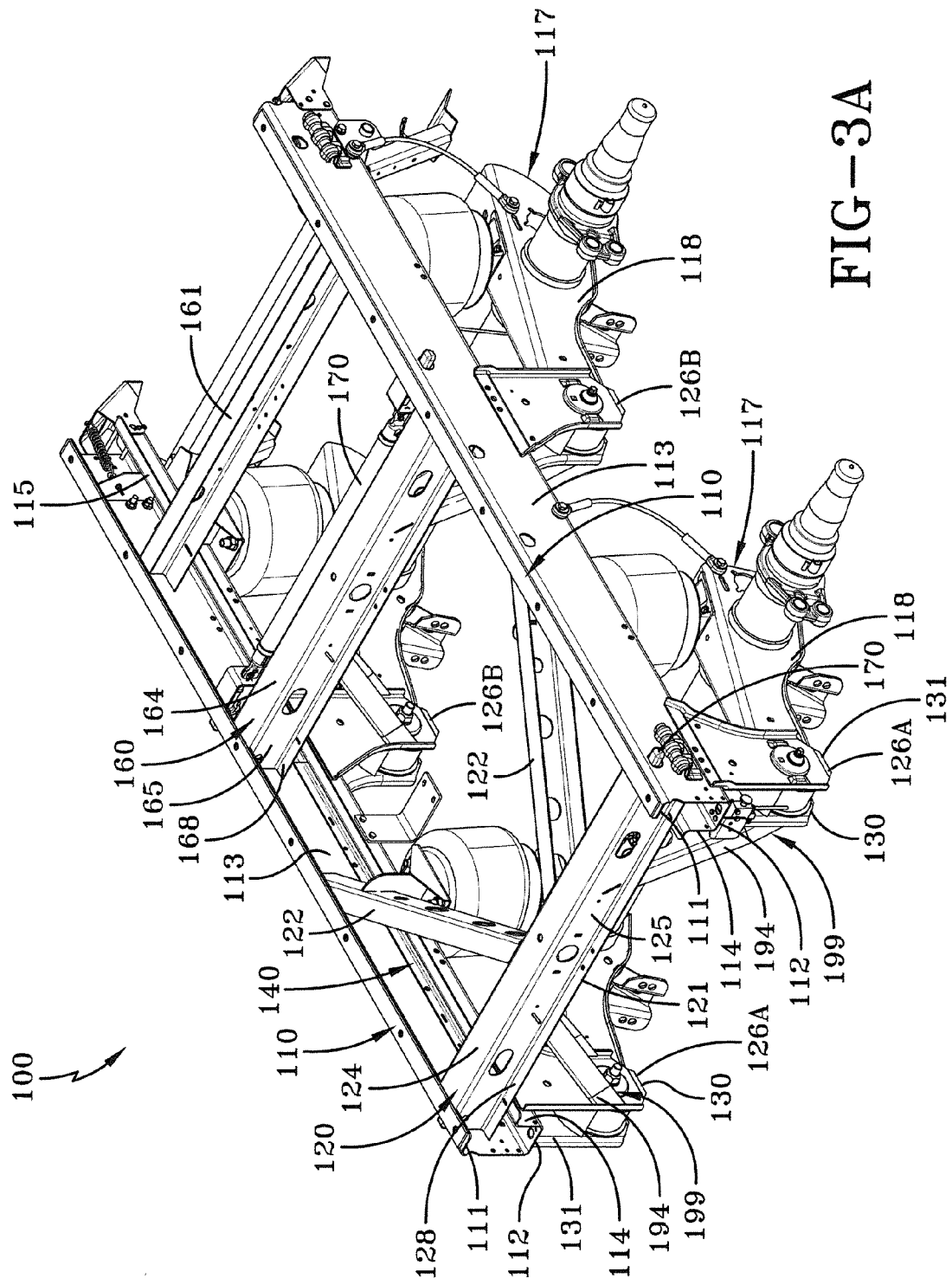
FIG. 3A is top front perspective view of the preferred embodiment slider box of the present invention shown in FIG. 3, showing the U-shaped channel extending along the front portion of the slider box.
Figure 3B:
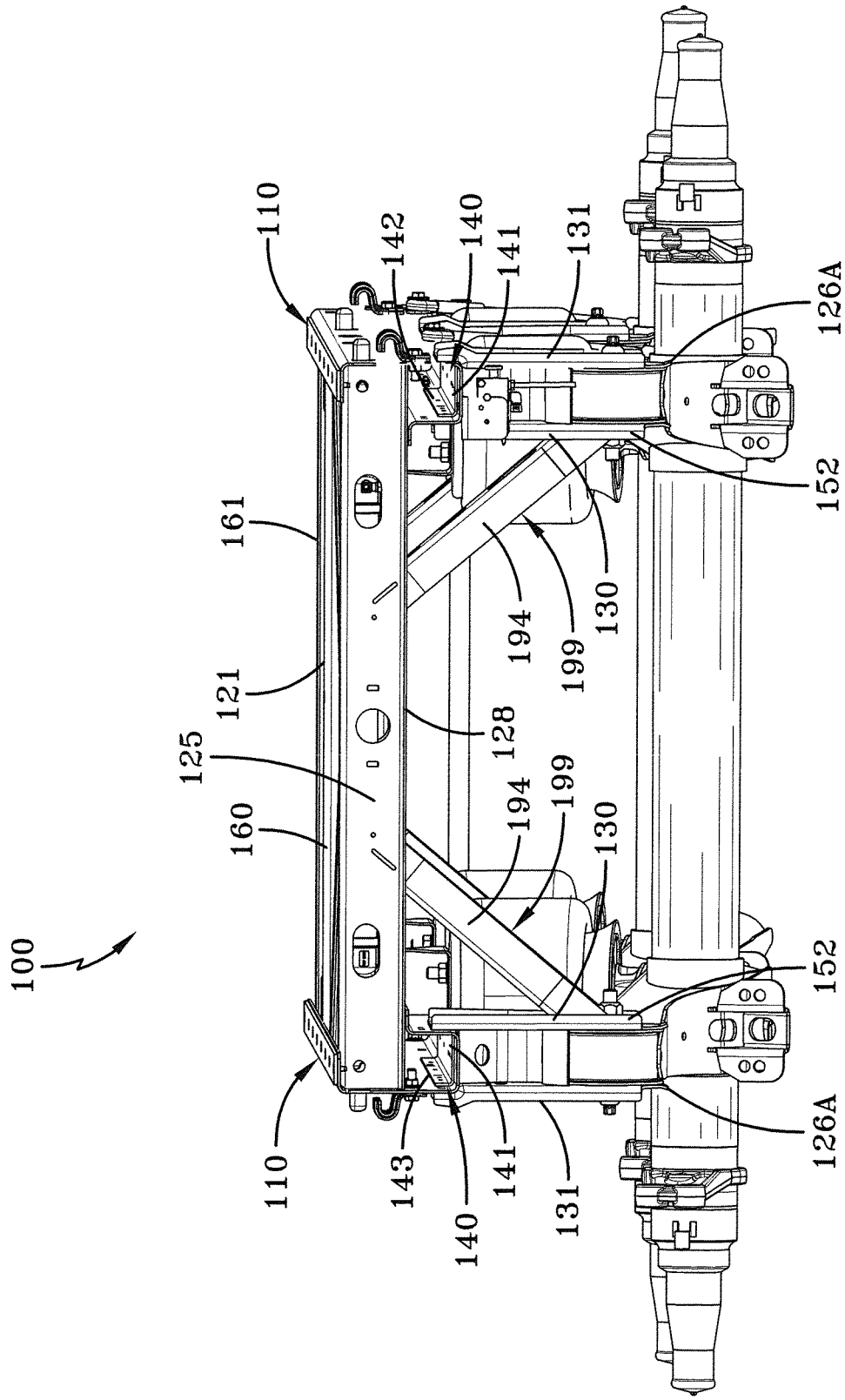
FIG. 3B is a front perspective view of the preferred embodiment slider box of the present invention shown in FIG. 3, showing the U-shaped channel located in the bottom portion of the G-shaped main member.

With particular reference to FIGS. 3A and 3B, a generally U-shaped channel 140 optionally is inserted into the bottom of main member 110 on bottom plate 112 adjacent outboard wall 113 and inboard wall 114 of the main member. More particularly, channel 140 includes a horizontal bottom member 141 connected to a vertical inboard member 142 and a vertical outboard member 143. Channel 140 can be formed by bending a single piece of flat stock or by assembling the various components together. Channel 140 is attached to main member 110 by spot welding vertical inboard member 142 and vertical outboard member 143 to flange 114 and outboard web 113, respectively. Bottom member 141 is also attached to main member bottom plate 112 via spot welds. Channel 140 extends longitudinally within main member 110 from above a front hanger 126A to above a rear hanger 126B. Channel 140 provides additional localized support to main members 110 at the front portion of slider box 100, between front hangers 126A and rear hangers 126B. This additional localized support aids in reacting various loads imparted on slider box 100, which are concentrated at the front portion of the slider box during operation of the heavy-duty vehicle, thereby helping to prevent possible bending or buckling of main members 110. Channel 140 is useful in providing localized support to main member 110, however, it should be understood that additional support for the main member could also be added universally by thickening the walls of the main member.

Front and rear pairs of hangers 126A and 126B, respectively, depend from respective ones of main members 110. With particular reference to FIG. 3, hangers 126A,B are longitudinally spaced from one another and pivotally mount front and rear axle/suspension systems 105A, 105B. Hangers 126A,B have similar structures and for the sake of clarity and conciseness herein only one of the front hangers 126A will be described in detail below. Hanger 126A includes an inboard wall 130 and an outboard wall 131 which are parallel and spaced apart from one another and which are interconnected by shelf 132 (FIG. 7), which extends between and is attached to the walls by suitable means. Hanger 126A is formed with a pair of front flanges 152, that each extend outwardly from the hanger generally perpendicular to inboard wall 130 and outboard wall 131, and extend along the front edge of respective ones of the inboard and outboard walls of the hanger. Hanger 126A is formed with a pair of rear flanges 153, that each extend outwardly from the hanger generally perpendicular to inboard wall 130 and outboard wall 131, and extend along the rear edge of respective ones of the inboard and outboard walls of the hanger. Beam 118 of a suspension assembly 114 is pivotally attached to hanger 126A via a bushing assembly (not shown) Wheels 150 are mounted on axle/suspension systems 105A,B (only curb side wheels shown) in a manner well known to those skilled in the art. Hanger 126A is mounted on main member 110 so that hanger inboard wall 130 generally vertically aligns and overlaps main member inboard wall 114, and so that hanger outboard wall 131 generally vertically aligns with and overlaps main member outboard wall 113. As a result, side, longitudinal and vertical loads imparted on hanger 126A by axle/suspension system 105A during operation of the vehicle are reacted directly into main members 110, thereby effectively and efficiently reacting the various loads.

Front K-shaped cross member 120 is located generally above front axle suspension system 105A. Rear cross member 160 extends between and is connected to main members 110 above and adjacent to rear hangers 126B. Like base member 121, rear cross member 160 has a generally hat-shaped cross-section and is integrally formed with a front flange 168, a front vertical wall 165, a top wall 164, a rear vertical wall 167, and a rear flange 169. A rear cross brace 161 extends between and is connected to main members 110 above and adjacent to an air spring 124 and is connected to the main members in a manner well known to those skilled in the art such as welding. Each one of a pair of locking pin mechanisms 170 is mounted on the front and center portions of slider box 100 in a manner well known to those skilled in the art, for locking the slider box in place on a primary frame (not shown).

Figure 5:
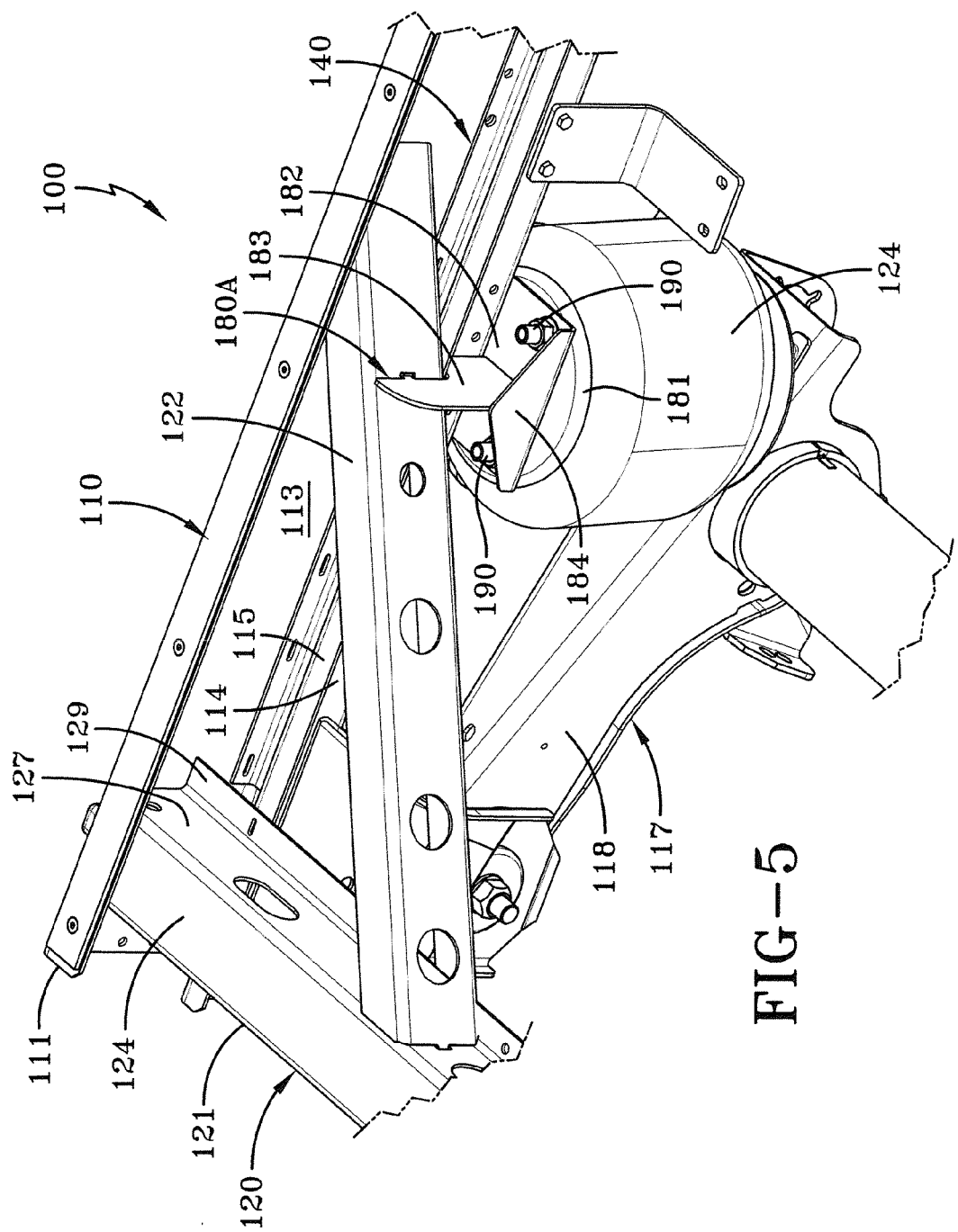
FIG. 5 is a greatly enlarged top fragmentary perspective view of a portion of the preferred embodiment slider box of the present invention shown in FIG. 3, and showing the curb side front air spring support attached to the top plate of the front air spring.

Turning now to FIG. 5 a bellows top plate 181 of each one of front air springs 124 is mounted on a front air spring support 180A via fasteners 190. Preferred embodiment slider box 100 of the present invention includes a pair of front air spring supports 180A, each attached to its respective suspension assembly of front axle/suspension system 105A. However, for purposes of clarity and conciseness, only the curb side air spring support will be described with the understanding that an identical air spring support is located on the driver side. More particularly, front air spring support 180A includes a generally rectangular plate 182 having an upwardly extending flange 184 formed at its inboard edge, and is also formed with an upwardly-extending generally flat vertically-extending column 183. Plate 182 is formed with a pair of openings (not shown) through which fasteners 190 are disposed to attach the plate to air spring top plate 181. Plate 182 is disposed adjacent to and flush with main member 110, and is fixedly attached to the main member in a manner well known to those having skill in the art, such as by welds, adhesive bonding or mechanical fasteners (not shown). The upper end of column 183 is attached to the outboard end of cross brace member 122 of K-shaped cross member 120 by any sufficient means such as welding or mechanical fasteners (not shown).

Figure 6:
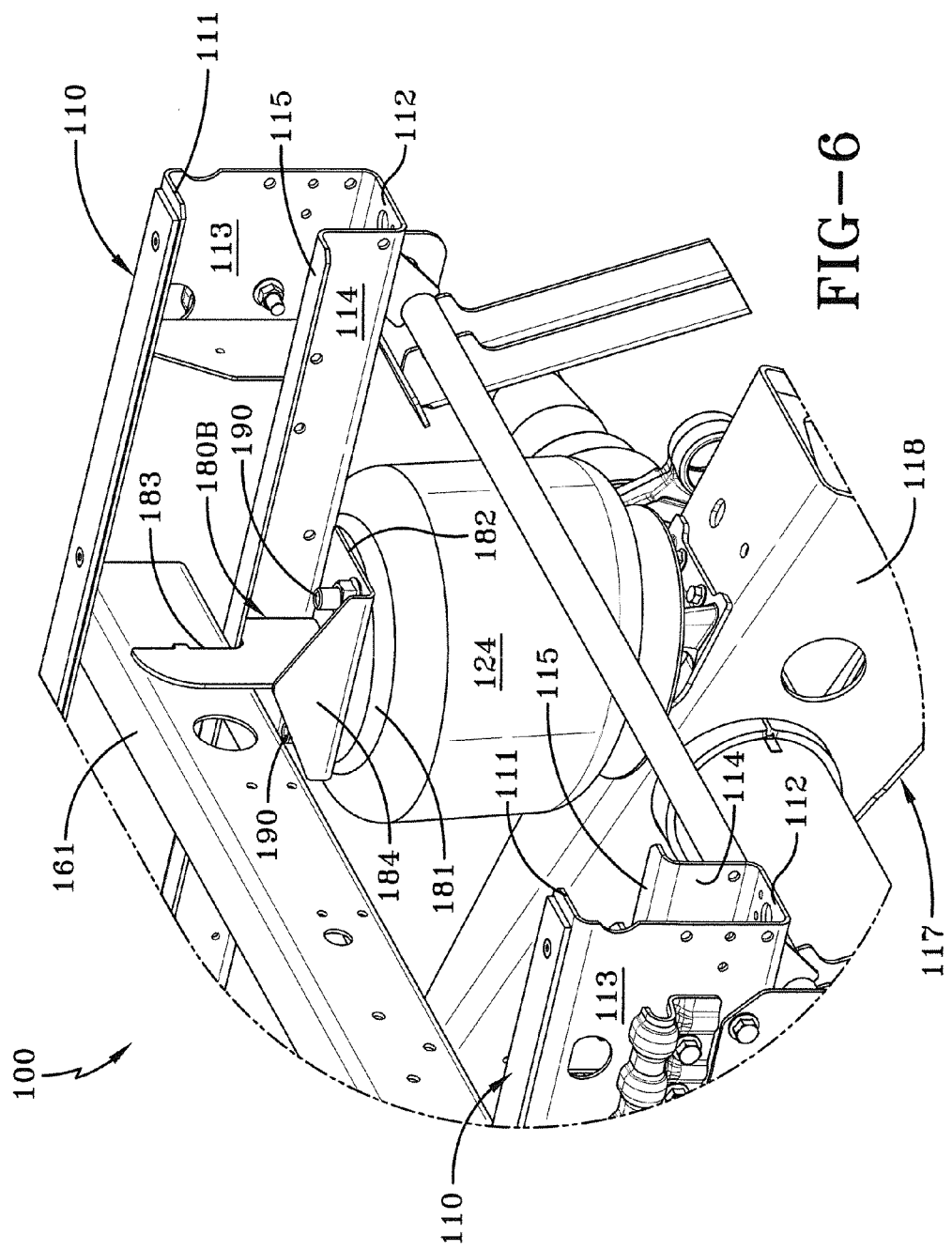
FIG. 6 is a greatly enlarged top rear fragmentary perspective view of a portion of the preferred embodiment slider box of the present invention shown in FIG. 3, and showing the curb side rear air spring support attached to the top plate of the rear air spring.

Turning now to FIG. 6, a rear air spring support 180B is mounted on a top plate 181 of each one of rear air springs 124 via fasteners 190. Preferred embodiment slider box 100 of the present invention includes a pair of rear air spring supports 180B, each attached to its respective suspension assembly of rear axle/suspension system 105B. However, for purposes of clarity and conciseness, only the curb side air spring support will be described with the understanding that an identical air spring support is located on the driver side. More particularly, rear air spring support 180B includes a generally rectangular plate 182 having an upwardly extending flange 184 formed at its inboard edge, and is also formed with an upwardly-extending generally flat vertically extending column 183. Rectangular plate 182 is formed with a pair of openings (not shown) through which fasteners 190 are disposed to attach the plate to air spring top plate 181. Plate 182 is disposed adjacent to and below main member 110, and is fixedly attached to the main member in a manner well known to those having skill in the art, such as by welds or mechanical fasteners (not shown). The upper end of column 183 is attached to the rear surface of the outboard end of rear cross brace 161 by any sufficient means such as welding or mechanical fasteners (not shown).

Front and rear air spring supports 180A,B provide strong support to front and rear air springs 124, respectively. More particularly, front and rear air spring supports 180A,B react vertical loads imparted on the air spring from the axle/suspension system during operation of the vehicle.

Figure 7:
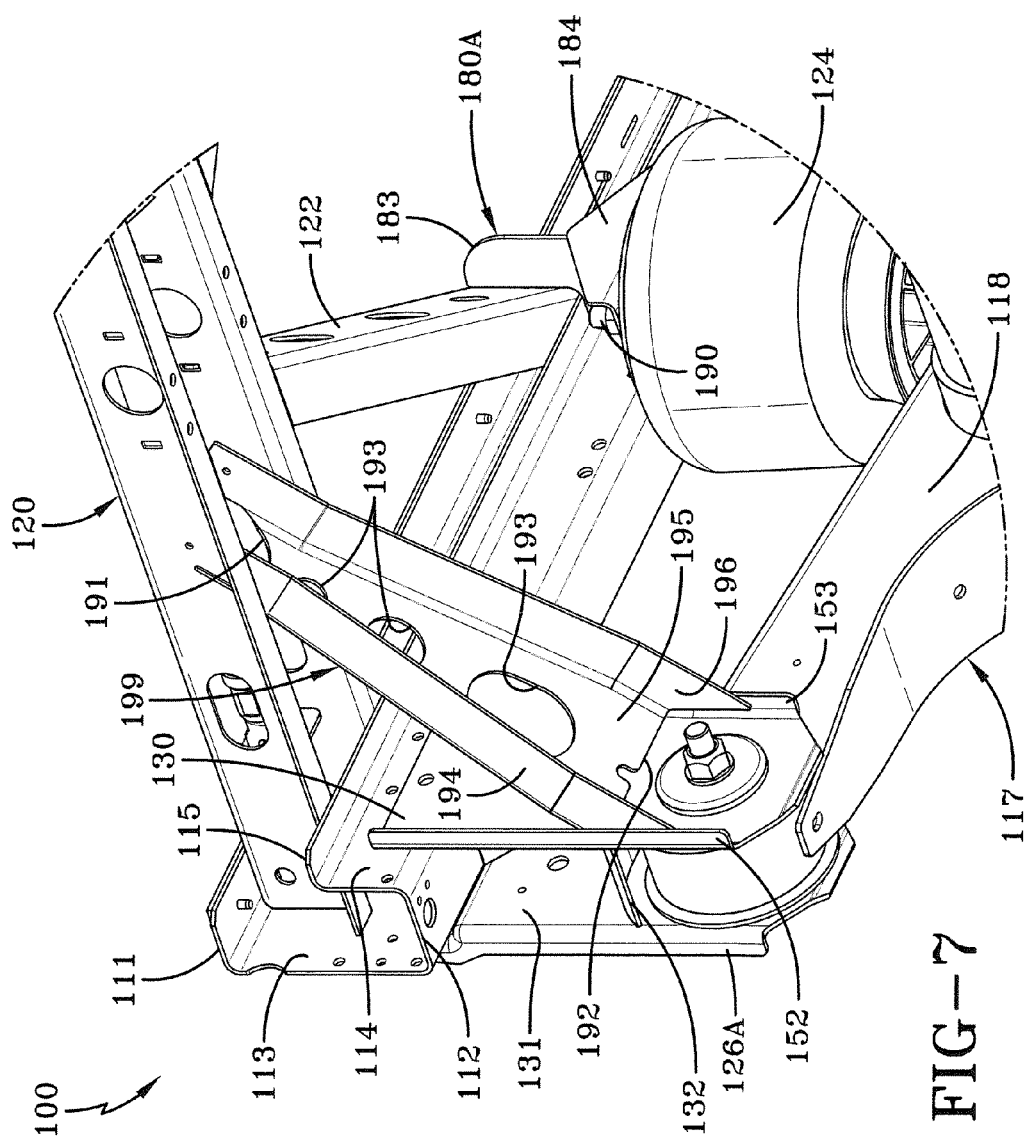
FIG. 7 is a greatly enlarged bottom front fragmentary perspective view of a portion of the preferred embodiment slider box of the present invention shown in FIG. 3, and showing the front curb side hanger support attached to the inboard wall of the front curb side hanger and also attached to the base member disposed adjacent to and above the hanger.

Turning now to FIG. 7, in accordance with other important features of the present invention, a hanger support 199 is rigidly attached to curb side front hanger 126A. Preferred embodiment slider box 100 of the present invention includes two pairs of hanger supports 199, with each hanger support attached to its respective front or rear hanger 126A or 126B. For purposes of clarity and conciseness, only the curb side front hanger support 199 will be described below with the understanding that identical hanger supports are attached to the remaining hangers 126A,B. Hanger support 199 has a generally upside down U-shaped cross sectional shape and includes an upper end 191 and a lower end 192. More specifically, hanger support 199 is integrally formed having a front vertical web 194, a diagonal side member 195 and a rear vertical web 196. Hanger support diagonal side member 195 is formed with a plurality of openings 193, which provide material and weight savings to hanger support 199. Hanger support upper end 191 nests in and is attached to base member 121 of K-shaped cross member 120 by welds or other means well known in the art, such as mechanical fasteners (not shown), so that hanger support front and rear vertical members 194,196, respectively, generally align with base member front and rear vertical walls 125,127, respectively. This arrangement allows for efficient reaction of side loads from the hanger directly into base member 121, during operation of the vehicle. Hanger support lower end 192 is rigidly attached to the inboard surface of front hanger 126A adjacent the beam pivot by mechanical or other means of rigid attachment such as welds (not shown). Hanger support front and rear vertical webs 194,196 nest in and overlap and generally align with hanger front flange 152 and hanger rear flange 153, respectively. Hanger support front vertical web 194 is located generally frontwardly of the pivot connection of beam 118 of suspension assembly 114 to hanger 126A. Hanger support rear vertical web 195 is located generally rearwardly of the pivot connection of beam 118 of suspension assembly 114 to hanger 126A. It should be noted that rear hanger support upper end 191 nests in and is attached to rear cross member 160 and rear hanger support lower end 192 is rigidly attached to the inboard surface of rear hanger 126B. Diagonally-extending hanger support 199, together with the manner and location of its attachment to base member 121 and hanger 126A, effectively reacts side loads from the hanger directly into the base member during operation of the vehicle.

Slider box 100 of the present invention overcomes the deficiencies of prior art slider boxes by utilizing a main member 110 that includes a pair of spaced apart parallel vertical walls 114,113 that generally align with spaced apart parallel inboard and outboard walls 130,131, respectively, of the hangers 126A,B. Slider box 100 utilizes hanger supports 199 with front and rear vertical webs 194,196 that generally align with spaced apart front and rear vertical walls 125,127 of frame base member 121, which in combination allow for use of main members, cross members, hangers, supports and support members having generally thinner walls. The improvements of preferred embodiment slider box 100 of the present invention also enable removal of additional angled cross brace members 28 adjacent to and above the rear axle/suspension system of the slider box, thereby saving two feet of cross brace length and reducing the weight of the slider box. The improvements of preferred embodiment slider box 100 of the present invention also enable removal of reinforcement bar 31, thereby further reducing the weight of the slider box. As a result, slider box 100 of the present invention is significantly lighter than prior art slider box 20. Hanger supports 199 distribute side loads directly into base members 120 and cross member 160 located above front and rear hangers 126A,B, respectively, allowing the hangers to react larger side, vertical and longitudinal loads directly into the base member and cross member vertical walls. Air spring support 180A,B allows for full air spring head support directly over inboard cantilevered air spring 124, and therefore provides strong vertical support to the air spring during operation of the vehicle. Racking load support is provided by angled cross brace members 122 over the front axle/suspension system only, thus allowing for straight rear cross brace 161 over the rear axle/suspension system to reduce weight by eliminating the need for additional angled cross brace members over the rear axle/suspension system. Channel 140 provides additional localized support to main members 110 at the front portion of slider box 100, between front hangers 126A and rear hangers 126B where lateral, longitudinal and vertical loads are concentrated during operation of the heavy-duty vehicle, thereby helping to prevent possible bending or buckling of the main members. These advantages reduce the overall weight of slider box 100 of the present invention without loss of structural integrity, but rather with an improvement thereto. In fact, main members 110 of slider box 100 of the present invention have a greater resistance to side induced bending than prior art slider main members 22. In addition, main members 110 of slider box 100 of the present invention have a resistance to longitudinal induced bending that more closely corresponds with the input load vectors encountered during operation of the vehicle, thereby resulting in more efficient reaction of the longitudinal loads by the slider box.

The slider box of the present invention has a wide range of potential applications including, without limitation, the refrigerated van and dry van markets, as well as any other weight sensitive subframe application. Moreover, the concepts of the present invention could also be employed on non-movable or fixed subframes, such as those found on grain haulers, dump trailers or fuel tankers, or on vehicles that do not have a subframe, but rather only have a primary frame, such as a flatbed trailer or certain dump trailers, as well as leading or trailing aim axle/suspension systems. It is contemplated that the slider box of the present invention could be utilized with all types of axle/suspension systems, without changing the concept or operation of the present invention. It is further contemplated that the slider box of the present invention could be formed from metals or other rigid materials such as composites, without changing the overall concept or operation of the present invention. It is also contemplated that hanger support 199 could have other cross-sectional shapes, such as square, without changing the overall concept or operation of the present invention. It is also contemplated that air spring support 180A,B could have other shapes, such as square, circular or flat, without changing the overall concept or operation of the present invention. It is also contemplated that U-shaped channel 140 could have other shapes, such as rectangular or flat, without changing the overall concept or operation of the present invention. It is even further contemplated that slider box 100 of the present invention could be utilized without generally K-shaped cross brace structures 121, without changing the overall concept or operation of the present invention. It is also contemplated that main members 110 of slider box 100 of the present invention could be utilized having different cross sectional shapes while maintaining the two spaced-apart parallel vertical walls, such as a U-shape or other such shape, without changing the overall concept or operation of the present invention. It is even further contemplated that hangers 126A,B, cross members 160 and base member 121 could have other shapes while maintaining the two spaced apart vertical walls, without changing the overall concept or operation of the present invention.

Accordingly, the slider box for heavy-duty vehicle trailers of the present invention is simplified, provides an effective, safe, inexpensive and efficient structure and method which achieves all the enumerated objectives, provides for eliminating difficulties encountered with prior art slider boxes, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the slider box for heavy-duty vehicle trailers of the present invention is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A frame for a heavy-duty vehicle trailer comprising:
   a) a pair of spaced-apart, parallel, elongated and longitudinally extending main members, each one of said pair of main members including a pair of spaced apart parallel vertical longitudinally extending walls;
   b) at least one cross member extending between and being attached to said main members, said cross member including a pair of spaced apart parallel transversely-extending front and rear vertical walls; and c) a first pair of hangers, each one of said hangers including a pair of spaced-apart parallel vertical walls, said hanger vertical walls each generally being aligned with and attached to a respective one of said main member vertical walls, each one of said hangers including a hanger support, said hanger support including a pair of spaced apart front and rear vertical webs formed with a diagonally extending side member, said hanger support attached to an inboard hanger vertical wall and to said cross member, so that said hanger support vertical webs each generally align with a respective one of said cross member vertical walls.

2. The frame for a heavy-duty vehicle trailer of claim 1, further comprising a generally U-shaped channel extending longitudinally along and being attached to each one of said main members.

3. The frame for a heavy-duty vehicle trailer of claim 2, wherein said channel extends longitudinally along said main member from said first pair of hangers to a second pair of hangers that are longitudinally spaced from said first pair of hangers.

4. The frame for a heavy-duty vehicle trailer of claim 1, further comprising an air spring support attached to said main member and to a cross member, for supporting an air spring of the heavy duty vehicle.

5. The frame for a heavy-duty vehicle trailer of claim 1, further comprising a pair of air spring supports, each one of said air spring supports attached to respective ones of said main members and to said cross member.

6. The frame for a heavy-duty vehicle trailer of claim 1, wherein said at least one cross member includes a base member having a pair of ends, said base member extending perpendicularly between and being attached to said main members at said base member ends, and a pair of inclined members each having a base end and an outboard end, said inclined members each extending angularly between and being attached to a respective one of said main members at the outboard end and said base member at the base end, said base ends of said base ends of said inclined members being attached to said base member in a spaced-apart relationship.

7. The frame for a heavy-duty vehicle trailer of claim 1, further comprising a means for selectively positioning said frame structure relative to said trailer for variable load distribution of cargo contained in the trailer.

8. The frame for a heavy-duty vehicle trailer of claim 7, wherein said means for selectively positioning said frame structure relative to said trailer is a retractable pin mechanism.

9. The frame for a heavy-duty vehicle trailer of claim 1, in which said frame structure is formed from steel.

10. The frame for a heavy-duty vehicle trailer of claim 1, wherein a material thickness of said main members is from about 0.231 inches to about 0.164 inches.

11. The frame for a heavy-duty vehicle trailer of claim 1, wherein a material thickness of said main members is about 0.164 inches.

12. The frame for a heavy-duty vehicle trailer of claim 1, each one of said pair of main members having a generally-G-shaped cross section.

13. The frame for a heavy-duty vehicle trailer of claim 1, wherein said hanger support front vertical web is attached to said hanger frontwardly of a pivot of said hanger, and said hanger rear vertical web is attached to the hanger rearwardly of said pivot of said hanger.

* * * * *